United States Patent [19]

Casten et al.

[11] Patent Number: 5,391,925
[45] Date of Patent: Feb. 21, 1995

[54] PRIME MOVER DRIVEN COMPRESSOR/CHILLER WITH MOTOR ON COMMON SHAFT FOR LARGE COOLING SYSTEMS

[75] Inventors: Thomas Casten, Hartsdale; Goran Mornhed, Croton-on-Hudson, both of N.Y.; Leif Bergquist, Monroe, N.J.; John M. Malahieude, Mamaroneck, N.Y.

[73] Assignee: Trigen Energy Corporation, White Plains, N.Y.

[21] Appl. No.: 118,629

[22] Filed: Sep. 10, 1993

[51] Int. Cl.⁶ ................................ F25B 27/00; F02C 6/00
[52] U.S. Cl. .................................. 290/1 R; 62/79; 62/238.1; 290/2
[58] Field of Search ............. 290/1 R, 2; 62/79, 238.1

[56] References Cited

U.S. PATENT DOCUMENTS

| | | | |
|---|---|---|---|
| 2,130,606 | 9/1938 | Wanamaker | 290/2 |
| 2,608,051 | 8/1952 | Nettel | 60/606 |
| 2,645,083 | 7/1953 | Brunner | 60/650 |
| 3,678,284 | 7/1972 | Peters | 290/1 R |
| 3,733,095 | 5/1973 | Sinclair et al. | 290/1 R |
| 4,065,055 | 12/1977 | De Cosimo | 290/2 |
| 4,281,256 | 7/1981 | Ahrens et al. | 290/1 R |
| 4,380,909 | 4/1983 | Sung | 62/79 |
| 4,648,242 | 3/1987 | Griesinger | 60/39.03 |
| 4,909,029 | 3/1990 | Pitt et al. | 60/39.182 |
| 4,920,276 | 4/1990 | Tateishi et al. | 290/2 |
| 5,074,115 | 12/1991 | Kawamura | 60/597 |
| 5,105,624 | 4/1992 | Kawamura | 60/608 |

*Primary Examiner*—Marc S. Hoff
*Assistant Examiner*—Robert Lloyd Hoover
*Attorney, Agent, or Firm*—Jay H. Maioli

[57] ABSTRACT

A method of driving a large cooling system having a compressor operating as a chiller driven by a prime mover, such as a gas turbine, reciprocating engine or steam turbine, in conjunction with an electric motor/generator coaxially arranged on a common shaft with the other units, so that as the ambient temperature rises and the power needed to produce the cooling output increases, and as there is a corresponding drop in power output if the prime mover is a gas turbine or condensing steam turbine, the required additional driving power is supplied by the motor. Conversely, as the ambient temperature drops and required cooling power lessens, the electric motor operates as a generator to convert the excess prime mover power to electrical power.

11 Claims, 4 Drawing Sheets

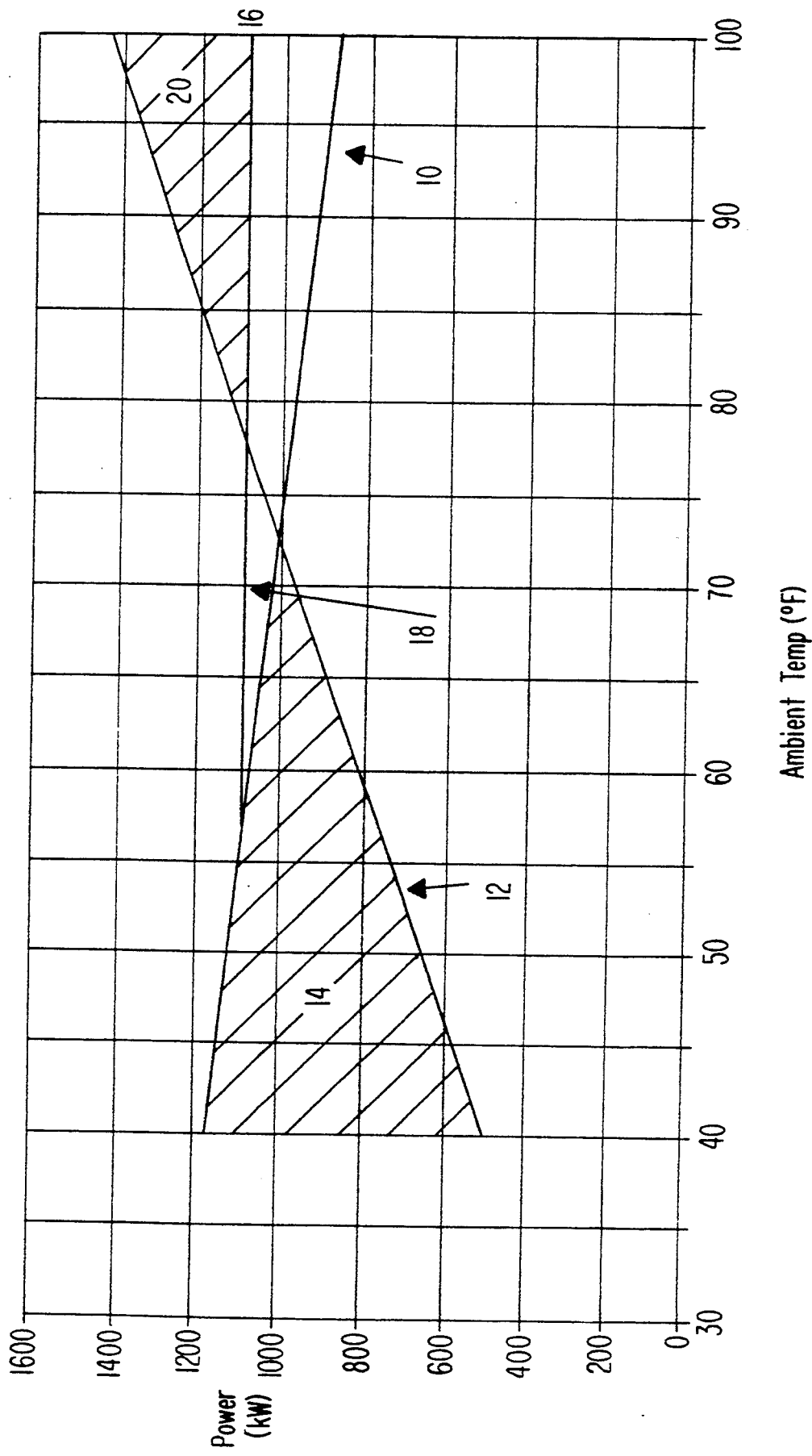

PRIME MOVER DRIVEN COMPRESSOR/CHILLER WITH MOTOR ON COMMON SHAFT FOR LARGE COOLING SYSTEMS

BACKGROUND OF THE INVENTION

1. Field of the Invention

This invention relates generally to enhancing the efficiency of converting oil, gas, steam or other fuels to cooling using a compressor and, more particularly, to a system for improving the operating efficiency by connecting to the power grid a motor which can operate as a cogenerator.

2. Description of the Background

Large cooling systems such as central, industrial or district cooling, are increasingly important as efficient and environmentally beneficial alternatives to producing cooling within individual buildings. Such systems involve large chillers typically driven by large induction motors or steam turbines, which use electric or steam power generated elsewhere. They seldom use prime movers like gas turbines or reciprocating engines, which generate power directly, because the economics of the short cooling season discourage investment in these more expensive prime movers. Although chiller systems with prime movers that generate power directly are known to be more efficient, two problems have hindered the rapid development of this concept. First, gas turbines or condensing steam turbines used to drive chilling compressors lose power under the very conditions in which the compressor requires maximum power, that is, when ambient temperature and resulting space cooling requirements are highest: in the summer months and during the daylight hours. Second, even if the power output of the prime mover is constant at higher ambient temperatures, as is the case with reciprocating engines, the chiller needs more power at those times. Conventionally, one must either purchase an oversized prime mover at significant capital cost or accept insufficient chilling output during periods of peak requirement. If the prime mover is oversized, its efficiency will drop during the cooler periods because it will operate at partial load.

OBJECTS AND SUMMARY OF THE INVENTION

Accordingly, it is an object of the present invention to provide a system for powering large cooling systems that can eliminate the above-noted defects inherent in the conventional systems.

A further object of this invention is to provide power to a large cooling system that cuts overall fuel consumption and provides electrical cogeneration.

In accordance with an aspect of the present invention, a prime mover is used in conjunction with an electric motor/generator to drive a compressor to produce chilling, with all units coaxially mounted on a common shaft requiring no clutches. When the chiller power requirements are high during high-temperature periods that correspond to the reduced power output periods of gas turbines or steam turbines, the power shortfall is made up by the electric motor using electricity from the power grid. Similarly, as the power requirements for the chiller decrease because the condenser is cooler at lower ambient temperature, a prime mover is able to put out excess power allowing the motor to produce electrical power for internal use or sale to the power grid.

The prime mover, the compressor, and the electric motor are all chosen to run at nominally constant shaft speed, so that the speed reduction gear, if any, is fixed, and there is never a need to uncouple any of the three major components. The electric motor is a synchronous motor.

If the prime mover is a gas turbine, improvement in the power output can be obtained by providing an inlet air cooling system using the cooling from the chiller compressor. Similarly, an exhaust heat recovery system can produce steam or hot water or other useful energy from the exhaust heat produced by either a gas turbine or reciprocating engine.

The above and other objects, features, and advantages of the present invention will become apparent from the following detailed description of illustrative embodiments thereof, to be read in connection with the accompanying drawings.

BRIEF DESCRIPTION OF THE DRAWINGS

FIGS. 1A–1C are graphs showing the prime movers' power production plotted against the ambient temperature (F.) in several embodiments of the present invention.

DETAILED DESCRIPTION OF PREFERRED EMBODIMENTS

The present invention contemplates the use of a prime mover, a motor such as an induction motor that operates at a synchronous speed, and a compressor, all coaxially connected on a common shaft. The shaft need not be forged as one piece but can be formed of the several shafts connected to function as a common shaft; no clutch is needed to decouple. Additionally, as optional features, the inlet air temperature to the gas turbine can be cooled to improve output efficiency as the ambient temperature rises and exhaust heat can be used to produce steam or hot water.

Figure 1B:
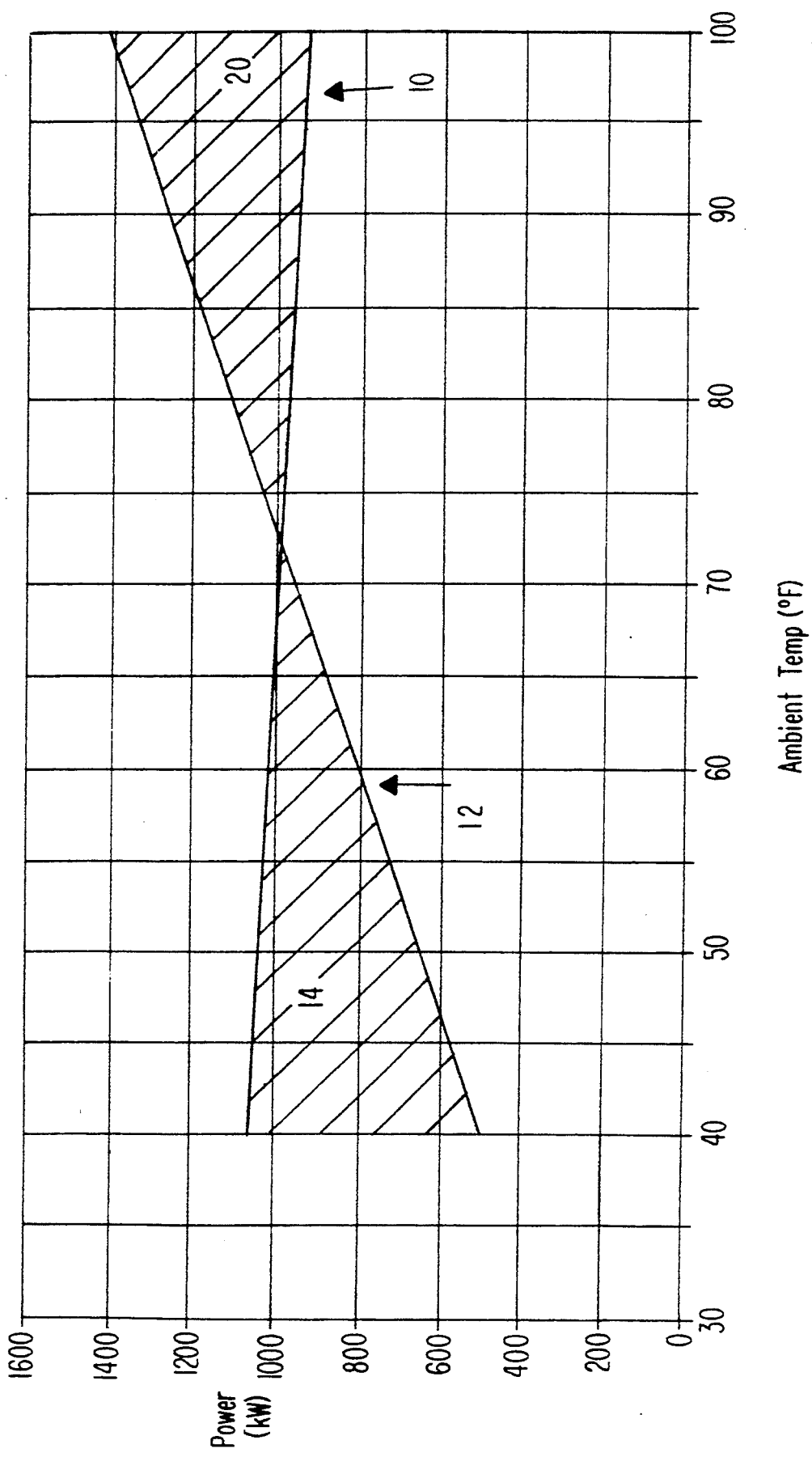

FIG. 1A represents the shaft power of a gas turbine plotted against the air temperature, so that the utilization of the synchronous electric cogeneration motor can be appreciated. FIG. 1B plots the output for a steam turbine and FIG. 1C for a reciprocating engine. These relationships will be the same regardless of the size of the prime mover or compressor used, as long as the ratio of their sizes is preserved. These curves are merely illustrative; however, prime movers and chillers having entirely different size ratios can be used to produce greater or lesser periods of electric generation. Moreover, it is understood, of course, that the curves are represented as straight lines for purposes of convenience only and some nonlinearities are present in the system response. Curve 10 represents how the prime mover power output decreases as the inlet air temperature rises. Typically such decrease for gas turbines in this embodiment is on the order of 30% with a 40° F. rise in temperature. On the other hand, curve 12 represents the required shaft power of the compressor chiller at full load. The chiller power requirement essentially doubles for a 30° F. rise in temperature.

Figure 1C:
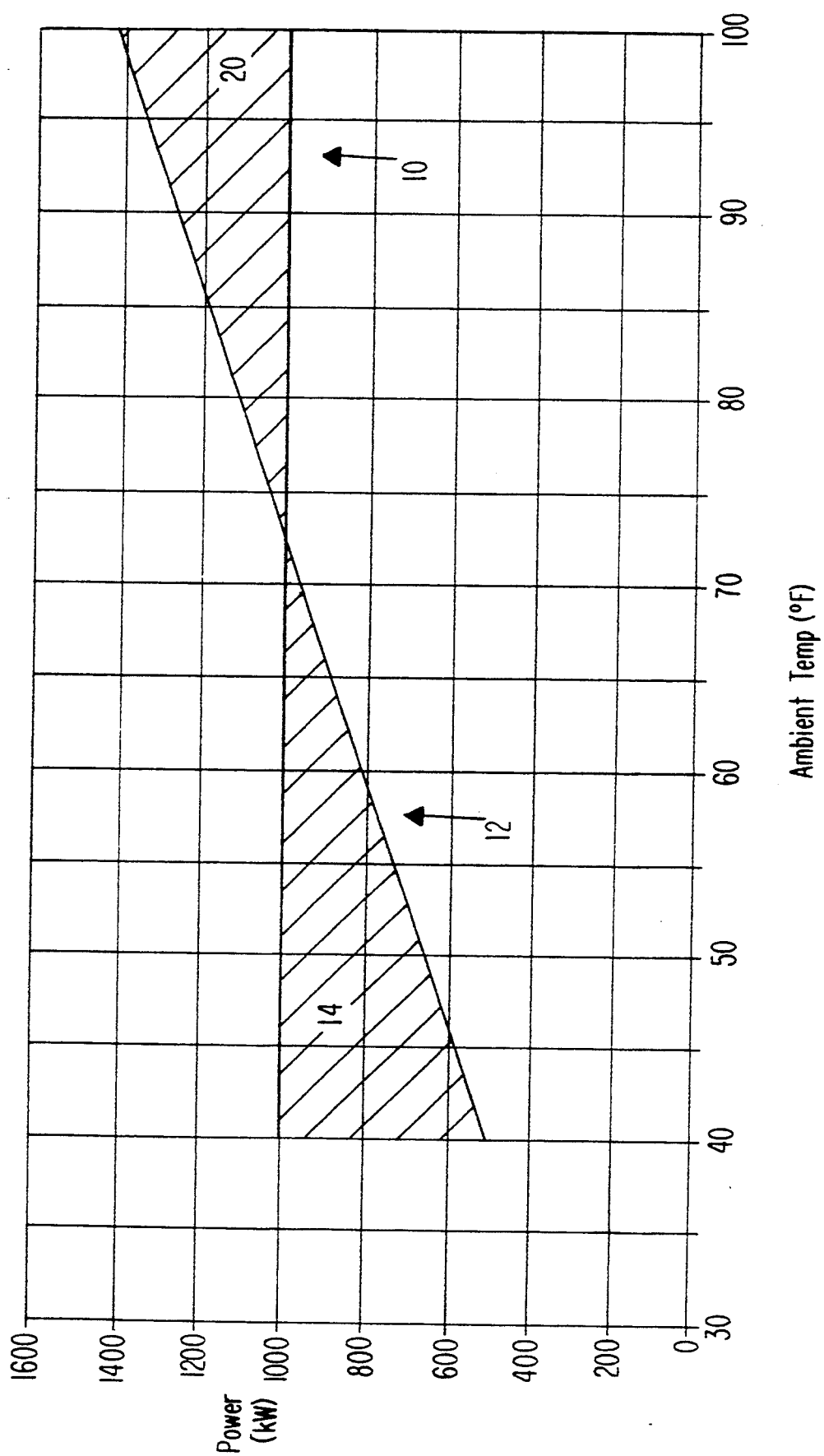

Thus, it is seen from FIGS. 1A–1C that, for the equipment sizes selected for these embodiments, power is available to generate electricity below about 72°. Area 14 shown cross-hatched in FIGS. 1A-1C represents the surplus power made available for cogeneration by the present invention. By cooling the inlet air to the gas turbine, the downward slope of the response curve 10 can be reduced. In other words, the drop in output power from the gas turbine can be substantially improved, as shown by line 16 in FIG. 1A. This optional feature increases the ability to produce electricity, with the increase represented by area 18 in FIG. 1A, and reduces but does not eliminate the requirement for the motor to supply power.

The period when the compressor power requirement exceeds the power output of the prime mover is represented by cross-hatched area 20. During this period the motor assists in driving the compressor, using power from the electrical grid.

Figure 2:
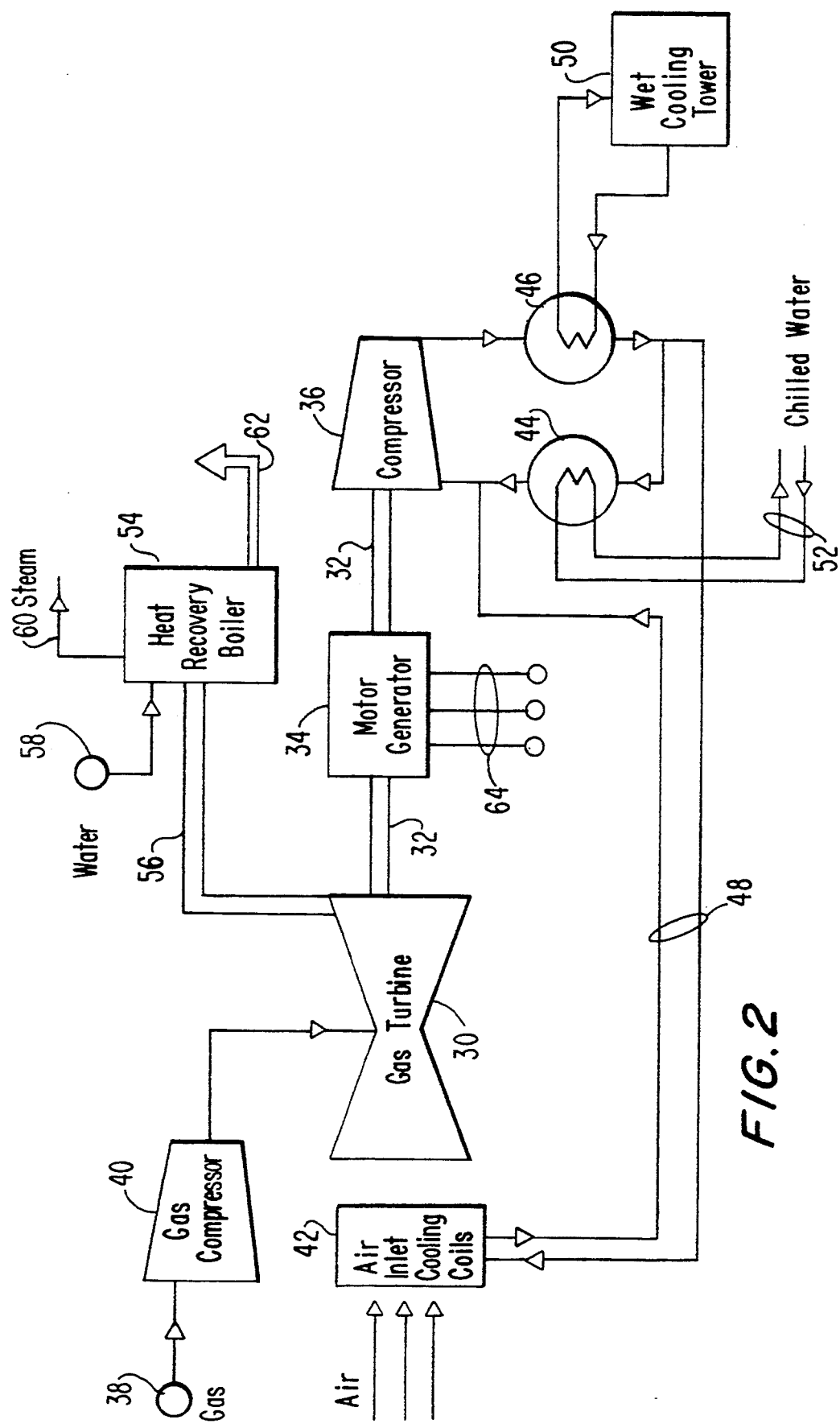
FIG. 2 is a system diagram of one specific embodiment of the present invention showing a gas turbine, a motor, and a compressor on a common shaft.

FIG. 2 represents in schematic form a system embodying the present invention that would operate as delineated in FIGS. 1A-1C.

The gas turbine 30 is connected by a functionally common shaft 32 to a motor/generator 34, with shaft 32 continuing through to drive a compressor 36. This specific order is not required, however. The compressor 36 could have a through-shaft connected directly to the output shaft of the gas turbine 30 with the motor 34 being connected to the other end of the compressor shaft, or the gas turbine 30 could have a through-shaft with one end connected to the compressor 36 and the other end connected to the motor 34. The motor 34 is a synchronous induction motor so chosen because it operates at a constant speed and, because of the characteristics of polyphase synchronous machines it can operate as both a motor and a generator at a constant speed. Similarly, the compressor 36 in this embodiment is a variable volume ratio screw compressor that also runs at a constant speed and can have its output varied by use of a slide valve. All of the prime mover choices can operate at a constant speed while varying the power output. Therefore, these three elements can be used without declutching regardless of the selected levels of output or input shaft horsepower, electricity used or generated, and compressed gas produced for chilling or other purposes.

Although a gas turbine 30 is shown as the prime mover in FIG. 2, the present invention is applicable to other kinds of drive elements, such as a steam turbine or reciprocating engine, for example.

FIG. 1A shows that the drop in shaft power of the gas turbine can be dramatically reduced if the inlet air is cooled. In FIG. 2, inlet air cooling coils 42 are arranged at the air inlet of the gas turbine 30. The compressor 36 employs an evaporator 44 and a condensor 46 connected in the conventional fashion. The inlet air cooling coils 42 are connected via lines shown generally at 48 to the respective evaporator 44 and condensor 46 of the ammonia compressor 36. The condensor 46 is also connected to a cooling tower 50 in the conventional configuration, with the chilled water available for the central or district cooling system on lines 52 from the evaporator 44. Alternatively, it could be connected to an air-cooled condenser. The cooling output of the compressor 36 is adjusted by means of a slide valve or vane control (not shown).

As an optional addition, in order to recover useful energy an exhaust heat recovery steam or hot water generator 54 is connected to the exhaust of the gas turbine 30 by duct 56. A water inlet 58 to the heat recovery boiler 54 permits steam or hot water to be produced on line 60, and excess heat is vented to the stack, as represented at 62.

In this embodiment, the compressor 36 comprises 2,000 tons of air conditioning driven by a 1,200 kilowatt gas turbine engine 30 at a typical constant drive speed of 3600 RPM. A 480 volt induction motor 34 capable of producing 500 to 1200 kilowatts is connected to the common shaft 32 and to the mains of the power grid by conductors shown generally at 64. These illustrative values change depending on requirements and selected components, but in each case, the maximum output of the compressor can be obtained with an undersized prime mover and a relatively inexpensive motor, with the prime mover operating at or close to its optimal efficiency at all times.

The interrelation of motor and generator action of a synchronous motor is related to shaft power load or demand and, thus, to the torque angle. Motor 34 is connected by lines 64 to the electrical power grid, which has constant frequency and voltage and is capable of either absorbing or supplying power. The motor 34 will supply power to the power grid when the demand of the compressor 36 is less than the power output produced by the gas turbine 30, because when demand is reduced the motor 34 starts to speed up, the torque angle shifts, and the motor resists the increase in speed with a braking action that results in electrical generation. Conversely, when the cooling load is such that the compressor 36 requires more power than the gas turbine 30 can provide, the compressor 36 will slightly slow down the shaft 32, shifting the torque curve, causing the motor 34 to absorb power from the power grid sufficient to enable it to provide the needed additional power to drive the compressor 36.

An important feature of the present invention is that the prime mover 30 and motor 34 operate together, that is, simultaneously. The prime mover 30 is not stopped when the motor 34 starts to drive the compressor 36. Rather both drive units are always rotating along with the compressor drive, eliminating the need for clutches.

The above description represents a preferred embodiment of the present invention. However, it will be apparent that modifications and variations could be close effected by anyone skilled in the art without departing from the spirit or scope of the invention, which is to be defined by the following claims.

What is claimed is:

1. Apparatus for enhancing the efficiency of a large cooling system, comprising:
   prime mover means for producing rotary output power at a predetermined, substantially constant, speed at a drive shaft thereof;
   compressor means for compressing a gas as a refrigerant and producing cooling for a large cooling system, said compressor means having a drive shaft mechanically coaxially fixedly coupled to said drive shaft of said prime mover means, whereby said rotary output power is transferred to said compressor means to cause said compressor means to operate continuously at said predetermined, substantially constant, speed; and
   synchronous electrical motor means electrically connected to an electrical power grid of substantially constant voltage and frequency, said motor means having a drive shaft mechanically coaxially fixedly coupled with said drive shaft of said prime mover means and said drive shaft of said compressor means for operating at said predetermined, substantially constant, speed, whereby when said prime mover means produces rotary power at less than said predetermined speed said motor means draws electrical power from said power grid and causes said compressor means to operate at said predetermined speed and when said prime mover means produces rotary power at more than said predetermined speed said motor means supplies electrical power to said power grid.

2. The apparatus according to claim 1, wherein said compressor means comprises a variable volume ratio screw compressor.

3. The apparatus according to claim 1, wherein said compressor means comprises a centrifugal compressor.

4. The apparatus according to claim 1, wherein said prime mover means comprises a gas turbine.

5. The apparatus according to claim 1, wherein said prime mover means comprises a reciprocating engine.

6. The apparatus according to claim 1, wherein said prime mover means comprises a steam turbine.

7. The apparatus according to claim 1, wherein said prime mover means comprises a gas turbine and further comprising inlet air cooling coils arranged at an air inlet of said gas turbine means and being connected to receive said cooling from said compressor means, whereby the temperature of the inlet air to said gas turbine is lowered.

8. The apparatus according to claim 1, wherein said drive shaft of said motor means is a double-ended drive shaft having one end thereof mechanically coaxially fixedly coupled to said drive shaft of said prime mover means and another end thereof mechanically coaxially fixedly coupled to said drive shaft of said compressor means.

9. The apparatus according to claim 1, wherein said prime mover means comprises a gas turbine and further comprising an exhaust heat recovery steam/hot water generator connected to receive exhaust heat from said gas turbine and produce steam/hot water therefrom.

10. The apparatus according to claim 1, wherein said prime mover means comprises a reciprocating engine and further comprises an exhaust heat recovery steam/hot water generator connected to receive exhaust heat from said reciprocating engine and produce steam/hot water therefrom.

11. The apparatus according to claim 1, wherein said synchronous electric motor means comprises a polyphase induction motor.

* * * * *